United States Patent [19]

Fisun et al.

[11] Patent Number: 5,862,247
[45] Date of Patent: Jan. 19, 1999

[54] PERSONAL AND PROPERTY IDENTIFICATION SYSTEM

[75] Inventors: Oleg Ivanovich Fisun; Lev Nikolaevich Lupichev; Viktor Vassilevich Maklakov, all of Moscow, Russian Federation; Richard Schimko, Fischerinsel, Germany

[73] Assignee: Borus Spezialverfahren und -gerate im Sondermaschinenbau GmbH, Berlin, Germany

[21] Appl. No.: 222,095

[22] Filed: Apr. 4, 1994

[30] Foreign Application Priority Data

Apr. 2, 1993 [DE] Germany ............... 43 11 295.1

[51] Int. Cl.[6] .............................. G06K 9/00; G06K 9/76
[52] U.S. Cl. ...................... 382/116; 382/210; 283/89; 283/901
[58] Field of Search ............................ 382/2, 3, 31, 4, 382/115, 116, 119, 124, 210; 340/825.34; 359/2; 235/379, 380; 250/271; 283/75, 77, 89, 112, 901; 355/40

[56] References Cited

U.S. PATENT DOCUMENTS

| | | | |
|---|---|---|---|
| 3,640,009 | 2/1972 | Komiyama | 40/2.2 |
| 3,643,216 | 2/1972 | Greenaway et al. | 382/115 |
| 4,048,618 | 9/1977 | Hendry | 382/124 |
| 4,222,662 | 9/1980 | Kruegle | 355/40 |
| 4,236,082 | 11/1980 | Butler | 250/461 R |
| 4,277,774 | 7/1981 | Fujii et al. | 340/146.3 |
| 4,365,310 | 12/1982 | Green | 364/822 |
| 4,368,979 | 1/1983 | Ruell | 250/271 |
| 4,454,610 | 6/1984 | Sziklai | 382/119 |
| 4,476,381 | 10/1984 | Rubin | 235/375 |
| 4,532,508 | 7/1985 | Ruell | 382/210 |
| 4,958,376 | 9/1990 | Leib | 382/31 |
| 4,970,389 | 11/1990 | Danforth et al. | 250/271 |
| 4,993,068 | 2/1991 | Piosenka et al. | 382/2 |
| 5,005,873 | 4/1991 | West | 283/92 |
| 5,095,194 | 3/1992 | Barbanell | 382/4 |
| 5,103,486 | 4/1992 | Grippi | 382/2 |
| 5,150,420 | 9/1992 | Haraguchi | 382/3 |
| 5,337,358 | 8/1994 | Axelrod et al. | 340/825.34 |

FOREIGN PATENT DOCUMENTS

| | | | |
|---|---|---|---|
| 2845567 | 4/1980 | Germany | G06K 19/08 |
| 4125198 C1 | 5/1992 | Germany | G06K 19/073 |
| 63-298582 A | 12/1988 | Japan | G06K 7/12 |
| WO 84/03646 | 9/1984 | WIPO | B07C 5/34 |

OTHER PUBLICATIONS

"Optical Holograph" By P. Harihanan pp. 146–161, 207–208.
European Search Report, Dec. 4, 1997, No. EP 94 25 0085.

*Primary Examiner*—Bipin Shalwala
*Attorney, Agent, or Firm*—Alix, Yale & Ristas, LLP

[57] ABSTRACT

System for identification of a person (P, P') or an object with an information carrier (1; G, 20), including at least one identification (IA, IB, IC; K) not perceptible with a human sense organ characteristic for a certain person (P, P') or an object (G), a device (2; 22, 23) for the inscription of the identification (IA, IB, IC; K) on to the information carrier (1; G, 20) and a device (8) to the read and evaluate the identification, wherein the information carrier (1; G, 20) carries a recording detectable only in ultraviolet light of a predestined range of wavelengths which is containing the identification (IA, IB, IC; K) and that the device for the inscription (2; 22, 23) includes means for the generation (7) and the device (8) for reading and evaluating includes means for reading the recording by means ultraviolet light.

17 Claims, 4 Drawing Sheets

Fig. 1

PERSONAL AND PROPERTY IDENTIFICATION SYSTEM

BACKGROUND OF THE INVENTION

The invention relates to a system for identification of a person or an object with an information carrier comprising at least one identification mark not perceptible with a human sense organ. Such a system for identification is known already from everyday life, especially in form of money cards of automatic banking systems, where a person uses an information carrier bearing an identification information, which is not perceptible by human sense organs (money card with magnetic coding). Cash may be taken from such automatic banking system, such device having provisions for reading and evaluation the identification information.

Within a station for the production of money cards a device is included for the (initial unique) inscribing of the identification information to the information carrier.

Such systems are furthermore to be found in credit and customer card systems as well as in buildings with respect to giving access to the building.

A fundamental disadvantage in most systems being used is the danger of misuse by persons, which are in unauthorized possession of a money, customer or identity card.

There is a certain amount of protection in the usual assignment of an individual code numbers (pin) to the authorized person when issuing the cards, but when these code numbers are not kept secret there will be no protection against misusing the card finally.

A known idea to prevent the misuse of identity, customer—e.g. cards by unauthorized persons is in checking the identity of the person presenting the card by external characteristics of the person or its signature.

This makes necessary the availability of a photo or a specimen signature at each possible place where the card might be presented.

Since no specimen copy can be positioned at any possible place of presentation in very large systems this might be placed directly on the card or might be accessible on-line from a central memory.

There is a considerable danger of falsification encountered in the first solution, the second one demands considerable effort in maintaining the data connection channels and are time-consuming because of the access, transmission and processing times not to be neglected.

The danger of falsification may be reduced—but not completely avoided—as it has been described in the German Offenlegungsschrift 2 845 567 by combining several identifications on a personal identity cards—and if necessary further reduced by using a complicated technical procedure of inscription.

In the German Offenlegungsschrift 41 25 198 it has been proposed to assign to any person authorized access a data system a portable device including a data chip and a reading device for the finger tip. This functional unit however is costly in manufacturing and by far bigger and not as handy as a credit card, thus being unsuited for distribution in large quantities.

SUMMARY OF THE INVENTION

It is an object of the invention to provide a system for identification of the above mentioned kind, in which compared to conventional systems the safety against counterfeiting and misuse is further improved for universal and convenient use.

This has been achieved by an identification system with the features of claim 1.

The invention is based on the cognition, that under visible lighting conditions identifications on the carrier to be generated- and readable only in a predestined band in the ultraviolet band and not recognizable by the human eye will not be noted by a potential counterfeiter as an identification in the first place and cannot be altered without using highly developed technical resources.

On the other hand the generation, carrying, using, reading and evaluating of an information carrier being provided with such markings by the authorized person is nearly unchanged if compared to a conventional credit or customer card.

The information carrier according to the system of the invention may not replace these systems of identification however, but may be generally used instead of identity documents, for persons and even for animals.

Especially of importance is the use as accompanying document or alternatively in connection with an essential functional component for high tech appliances especially those being in a potential danger to theft (automobiles, motorbikes, high grade bicycles, leisure boats etc.) as being part of the frame or the cable harness. Another application would be the use as a constituent part of falsification proof documents for the identification of goods.

The information carrier included in the identification system according to the invention may—in a further development of the basic idea—preferably carry one or several further, visible identification(s), which serve besides their actual function to further conceal the actual not visible identification information.

The device for reading and evaluating may include special means to read this perceptible identification, where in a particularly advantageous realization there are means to conceal from the person to be identified the fact that the information carrier is evaluated by the device giving the impression to the person, that only the perceptible information is the relevant information. By this means the danger of falsification is further reduced.

Of special importance with respect to the invention is the fact that the detecting as well as the registration and the cross-check of the personal identification information is performed invisibly i.e. concealed from the person the identity of which is to be checked. This is done by the registration of personal physical characteristics by the registration device, which are concealed with respect to the field of vision of the person, i.e. they are placed behind a shade or under a desk used for signing a document of identification. The detection of the invisible information preferably is performed coinciding with the unconcealed detection of another identification information relevant to the person like the signature e.g. The improvement with respect to safety against counterfeiting may be seen in the fact, that if a person is obviously performing an act of identification when at the same time a second act of identification is performed in a concealed way a person willing to counterfeit is not going to recognize that there is a second identification process, which has to be faked.

Even if the cross-checking is done by an observing person this is done outside the field of vision of the person to be identified preferably behind a shade or coinciding with an unconcealed procedure of identification.

With respect to an securing object the identification information is placed on the object or on an identification card belonging to the object. The act of concealment in this case is done with respect to the person in charge of the object, especially during the acts of purchasing or selling the object or in the case of a repair, if a form has to be signed e.g.

In a preferred configuration of the invention the not perceptible, actually relevant identification is stored in a hologram generated by means of ultraviolet radiation in a conventional way or synthetically, including the advantage, that the identification may also be reproduced in case of a damaged or only partly accessible card.

In case of using a synthetically generated hologram, preferably generated by means of an integral transformation—making use of even a personal computer for production and reproduction. Hence not necessarily natural coherent light has to be used but—the generation of the hologram may be based on a Fourier or Laplace transformation instead.

In this case the identification is not visible to the eye even when illuminated by light of the "correct" range of wavelengths, whereby the security against counterfeiting is further increased.

In the case of identification of a person the identification conveniently comprises an information which is individual to the person as exact as possible, but also (under the conditions of the application) sufficiently quick to gain an information to be evaluated in a simple and reliable way. As such a portrait photo, a fingerprint or a handwriting- or speech sample may be used, where the photograph and specimen of handwriting are suited for visual evaluation, the result of the evaluation having not the same level of reliability as a fingerprint or a speech sample, which on the other hand makes a computer aided evaluation necessary.

The recording of a speech sample with the system according to the invention may preferably be performed in as optically registerable representation of a characteristic frequency diagram.

For the identification of objects on the other hand a figurative representation will be used only in exceptional cases (works of arts, leisure boats, old-timer cars, . . . ) Normally a physical identification will be used that may be generated under normal manufacturing conditions (serial- respectively product numbers e.g.).

The information carrier has the form of a separate document as an identity card, a vehicle document or a delivering- or accompanying document and/or a part essential for the function and or difficult to be removed from the object (for instance in the case of painting).

In a preferred embodiment the information carrier is bears multiple identifications at the same time (for instance a photograph and specimen of handwriting and/or a fingerprint), and during a process of identification the multiple identifications are read and evaluated by the reading device while a comparison of the several recorded identification characteristics to the detected characteristics of the actually to be identified person is performed by the comparator means.

It is particularly expedient if the actually detection and comparison of the characteristics of the person is performed by a device cross-checking the identifications with those in the information carrier unnoticed by the person to be identified in connection with the changing over of the information carrier or when carrying out other usual procedures of identification. Thus the presence of the identification information in the information carrier being additionally concealed, is danger of falsification or misuse further reduced.

This may be performed during the registration of a sample of handwriting (signature) via a pressure sensitive blotting pad or by simultaneous registration of the fingerprint by means of a writing utensil used by the signing person to be identified equipped with a respective optical, and/or a video take of the signing person by means of a hidden camera and/or the unnoticed recording of a speech sample.

It is also possible in a system corresponding to the invention that provides several of such read—and evaluation devices at the same time, that all of them make use of a complete evaluation of the information provided by the carrier imprinted identifications but combine only selected parts of information during evaluation.

Such a procedure would be especially advantageous in an integrated system for the identification of a person by means of an identity card in connection with the checking of the identity of the person in all situations (checking a banking account or the permission of entering a library e.g.) where the absolute evaluation of the identity of a person is of less significance.

Instead the automated device for detection and comparison of the hidden recorded information with the actual characteristics may—at least in less sophisticated systems— the visual comparison of the actual characteristics of the person with the displayed visualized hidden information may be performed by a living person like an employee of a bank or authority without leaving the scope of the invention.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DETAILED DESCRIPTION OF THE PREFERRED EMBODIMENT

Figure 1:
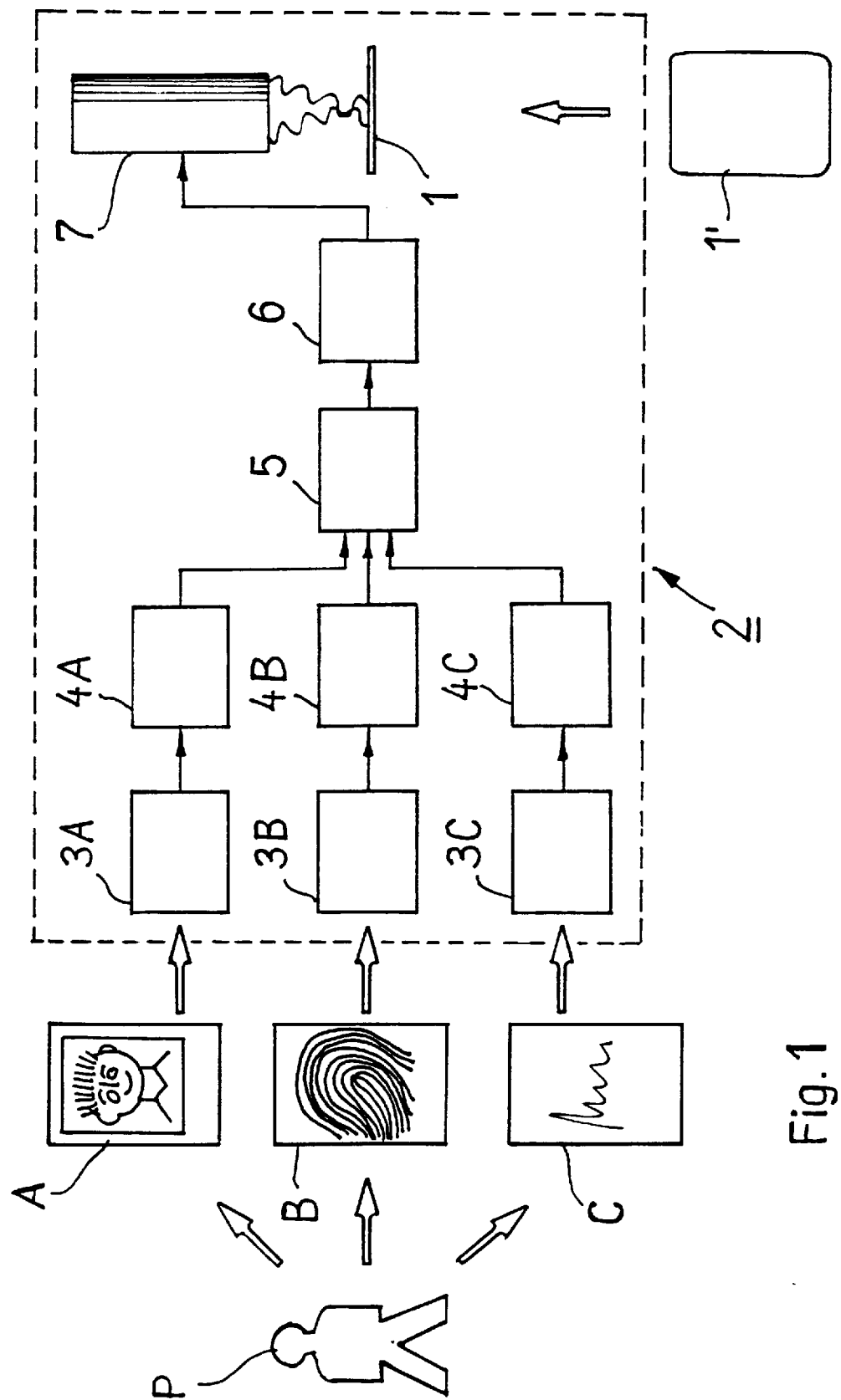
FIG. 1 is a principle representation of the device for the inscription of identification to an information carrier in a system of identification according to a first embodiment the invention.

In FIG. 1 a person P is represented, which is going to receive an identity card 1 where a passport photograph A, a fingerprint B as well as a specimen signature C are registered.

The carriers of information with respect to person P are transferred to a device 2 to imprint the identifications IA, IB and IC to the untreated card of identity 1' which has been also transferred to the device 2.

The device for inscribing 2 is basically comprising units 3A, 3B and 3C for the processing of the three information for identification IA, IB and IC in the form of image information transmitted in digital form. The digitized information for identification are supplied to respective memories 4A, 4B and 4C, from where they may be recalled by a processing unit 5. The information for identification IA, IB and IC are subjected one after the other to an integral transformation by processing unit 5 and thereby gaining the transforms of the information for identification f(IA), f(IB) and f(IC), which are supplied as control signals to an excimer-laser 7 by the control unit 6 for irradiating the surface the untreated identification card 1' made from cardboard or plastic material in the lower UV-range.

The radiation of the laser 7 is split by a (not shown) beam divider into two partial beams, of which one beam serves as reference beam for the generation of a surface hologram and the other beam is intensity modulated via the activating unit 6 as pseudo object beam with the transformed f(IA), f(IB) and f(IC), where the beam intensity is selected in a such a range, that the material of the card is inscribed with a latent image as a result of resonance absorption by the molecules of the material, whereby the surface of the card is neither effected to a visible nor by any other way noticeable change.

The identification information IA, IB and IC moreover is inscribed into the data carrying media in such a manner, that its elimination by "overwriting" would be possible only by means of exactly the device which had been used for the original registration. The inscription of a second, alternate marking would still be impossible.

The identification information is thus inscribed into the carrier in such a manner, that its removal at all events only would be possible by overwriting by means of a device exactly corresponding to the device used for original registration. This would not even permit the creation of a second different identification information.

In this manner the identifications IA, IB and IC of the person P are encoded into the ready identity card 1 in the form of a synthetic hologram by integral transformation in manner decodable only in the coherent ultraviolet light and by an integral transformation inverse to the type used with the encoding when the picture information was stored.

The identification information thus inscribed to the information carrier are not detectable by human sense organs without highly developed technical auxiliary resources—they are especially invisible and not sensible by touching—and even in the unlikely even when a visualization was successful not legible without the knowledge of the kind of transformation function applied during encoding.

After the described inscribing of the identification information to the identity card other visible identifications may be provided. This may contribute additionally to the concealment of the presence of the actually used identification information.

Figure 2:
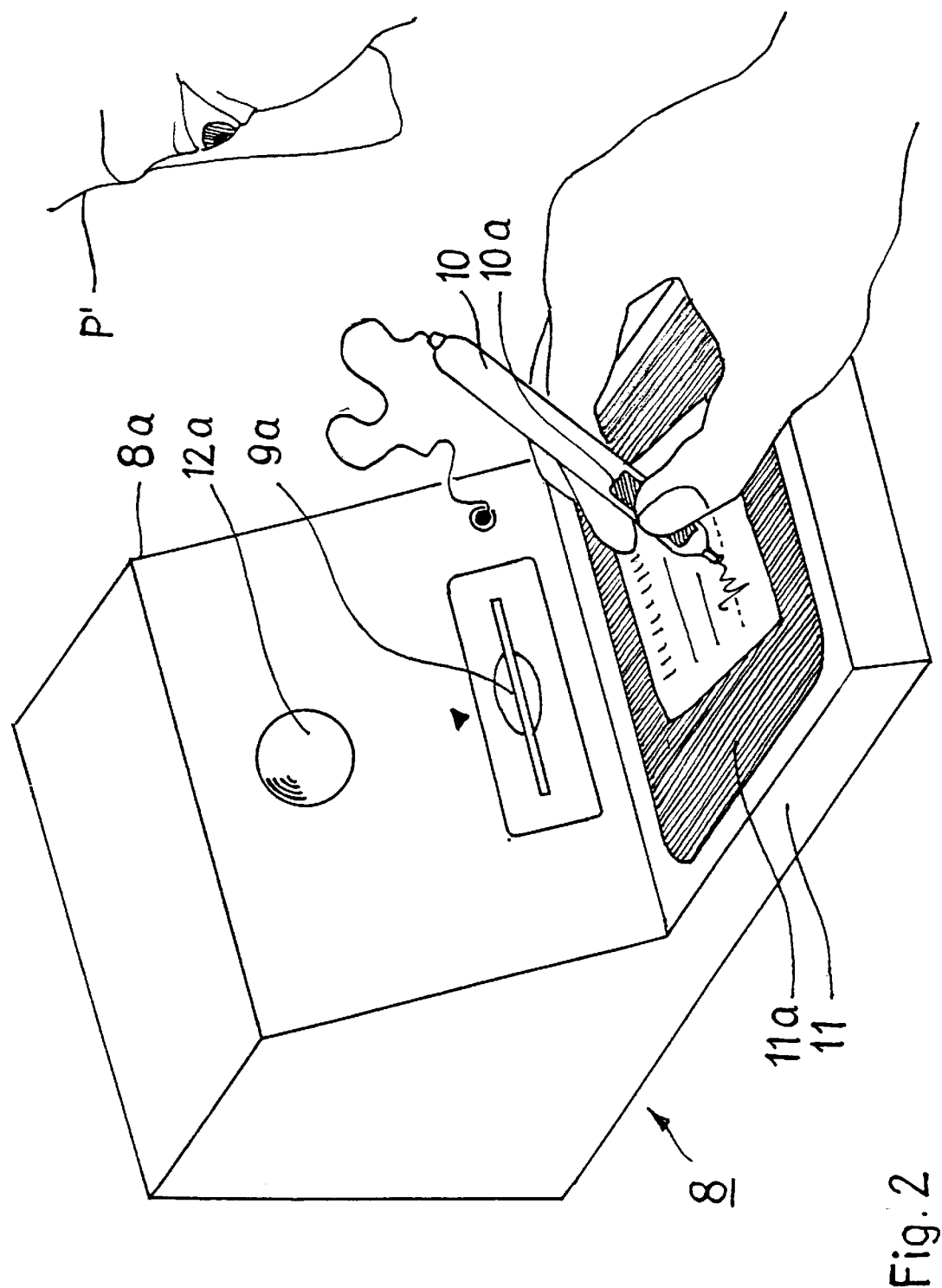
FIG. 2 is a perspective representation of the device to read and evaluate the identification of the system of identification according to the first embodiment.

With reference to FIG. 2 the use of a device to read and evaluate of the identification information for reading and evaluations is described with reference to the automated procedure cashing a check by a bank.

The identity card 1 has been inserted into a card reading station 9a by a person P'. The person signs the check by means of a writing device 10 which is electrically connected with the enclosures 8a of the device 8 on a blotting pad 11, where the person's face is in the vision field of an objective 12a of a still-video-camera 12 (concealed to the user P').

During the procedure of signing of the check the papillary line structure of the thumb of the user P' is registered by means of alighting—and objective for taking exposures (light emitting diodes and optics with light sensible picture device) via a (invisible) window 10a provided inside the special writing device 10 and by means of a pressure sensitive field 11 a the blotting pad 11 the signature registered, while at the same time a still-video is taken from the user's face.

Figure 3:
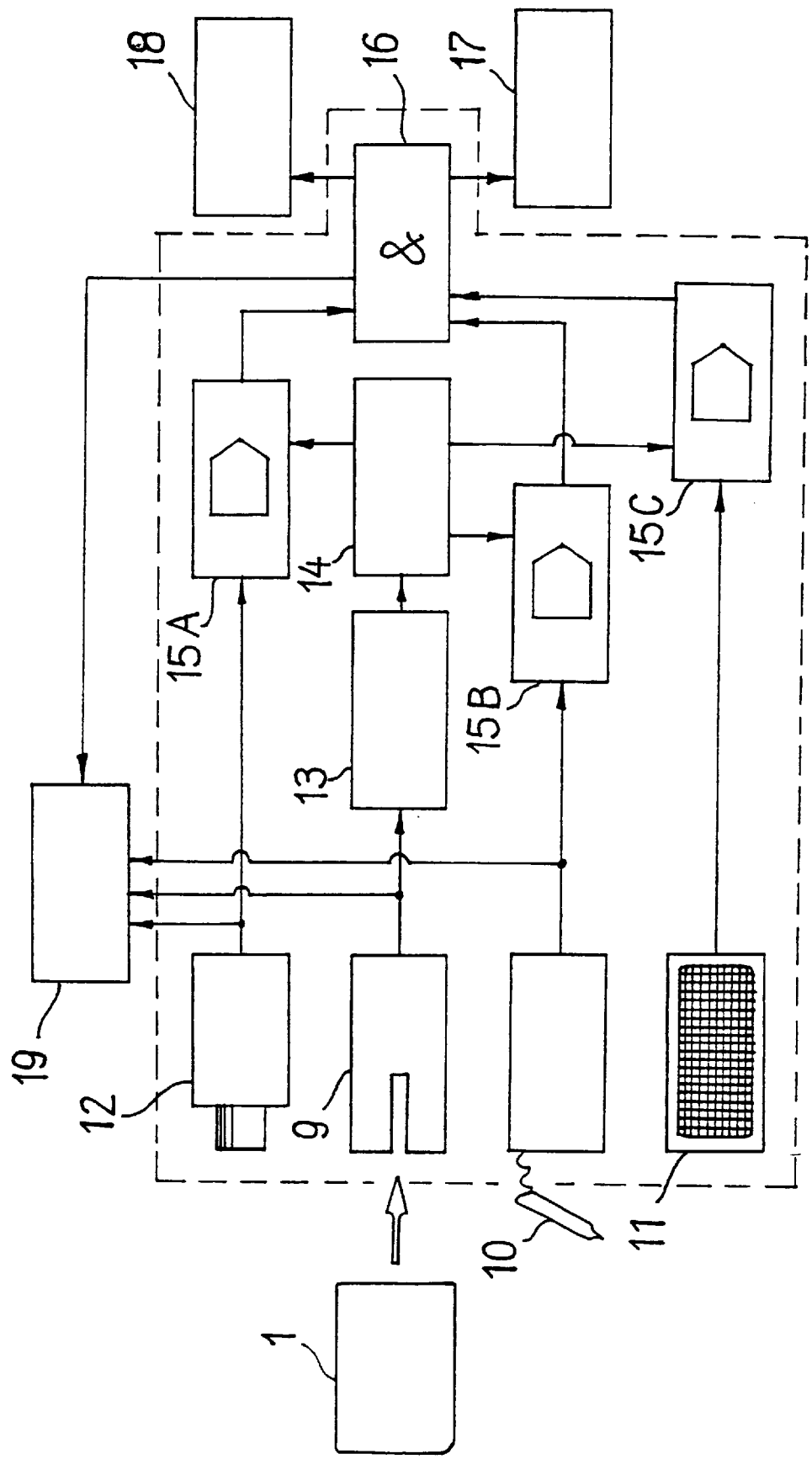
FIG. 3 is a principle representation of the device to read and evaluate according to FIG. 2 also with subsequent devices of the system of identification.

The stages for processing this information are shown in a schematic representation in FIG. 3:

While the card reading station 9 being provided with a UV-optic for the optic band of the inscribed identification information is reading the identifications, these are evaluated in a second processing unit 13—especially by means of an integral transformation inverse to the integral transformation used during encoding—and the resulting data a stored in a main memory 14, the actual information derived from the person P' will simultaneously be recorded and evaluated.

After termination of the conventional data processing the data derived from the video camera 12, the picture sensor or from the special writing device 10 and the pressure sensitive plate 11a, are transferred—suitably formatted—as well as the respective data of the identification information IA, IB or IC, to comparators 15A, 15B or 15C supplied, where the comparison of the stored identification data of the person P are compared to the actually recorded characteristic data of the person P'.

The respective results of the comparisons of all three comparators 15A, 15B and 15C is transmitted to an AND-Gate 16 in form of a true/false-information. The output of the AND-Gate in case of identity of all three or optionally only of two—the data will activate a release device 17, in case of non identity an alarming device 18 and simultaneously activate a memory for safety relevant data 19, into which the data derived from the video camera 12, the writing device 10 and the pressure sensitive plate 11a will be stored, will in case of an attempted misuses of the identity card by the person P'. These data may—if necessary—facilitate police investigations.

Subsequently the identity of the person P' may be secured by other means and—in the event that the message of the system of identification turned out to be false—a personal service by an employee of the operator of the system may take place.

The registration of the physical identification features and/or handwriting e.g. unnoticed by the person P' may also be performed by other means i.e. an optical scan of signature after it has been written, an unnoticed recording a speech sample during a preceding conversation.

Instead of one or several of the identification information described in the preceding examples the identification can be based on other or additional features of the person if necessary these may be characteristic body dimensions or a diagram of speech frequencies gained from a specimen of speech of the person.

It is also possible, to use only one or two identifications, in order to limit the technical effort.

At a modified embodiment the comparators 15A, 15B and 15C provide probability instead of true/false-statements, and the AND-gate 16 is replaced by a logical circuitry for linking these values of probability followed by a subsequent trigger circuit, which is activating the control device at exceeding, the alarming device and the safety memory however at underflow of a predestined resulting values of probability with respect to the identity the persons P and P'.

If necessary the information for identification may be stored in the form of a synthetic holograms. In another modified embodiment the use of photographic negatives of the of the passport photograph a, of the fingerprint B and the sample of handwriting C than objects to the generation of a "classical" hologram is provided and in a further modified embodiment the complete replacement of the holographic storage of the identification information by an uncoded UV-exposure of the figurative representations.

Figure 3A:
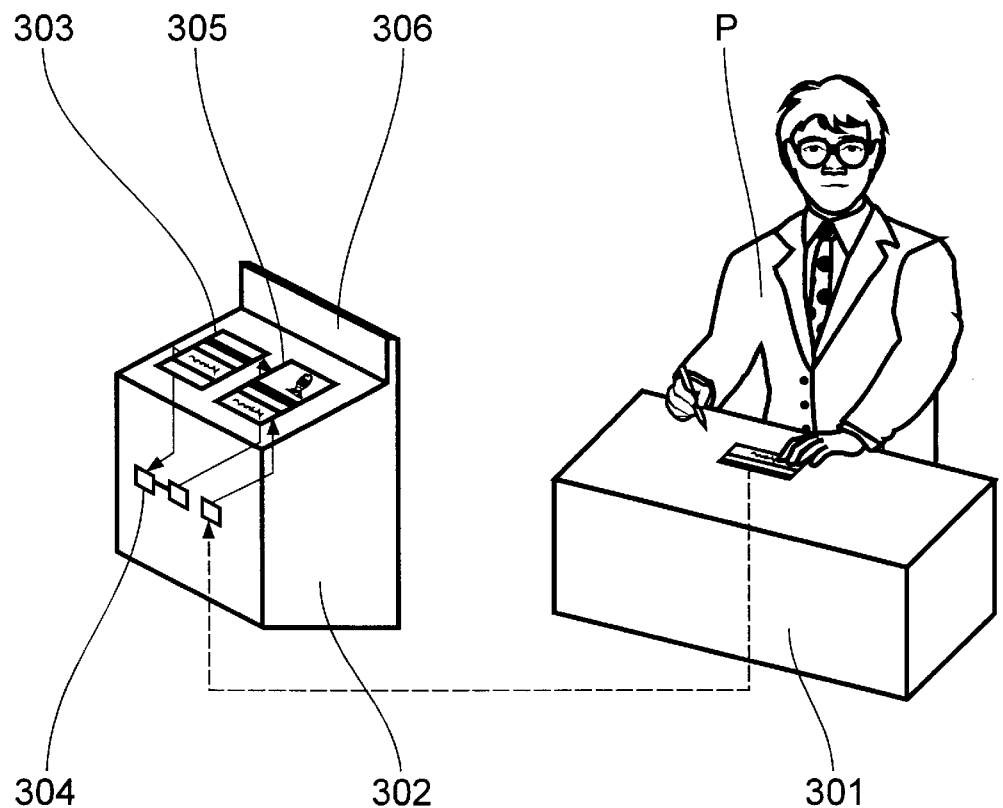
FIG. 3a is another embodiment of the device according to FIG. 3.

From FIG. 3a may be seen that the person P is during a course of a bank transaction writing a signature on a desk 301. The visibly written signature is scanned from a device concealed under the desk (not visible in FIG. 3a) and transferred to a control desk 302 for an observation person. On this desk the information carrier 303 is placed bearing the visible and the invisible identification information in form of a visible and an invisible representation of the signature and an invisibly coded passport photo. The invisible informations are processed by evaluation units 304 and the decoded information is visualized on a display 305. Thus all the identification informations and the personal physical characteristics of the person to be identified are visible to the observing person at the same time.

Figure 4:
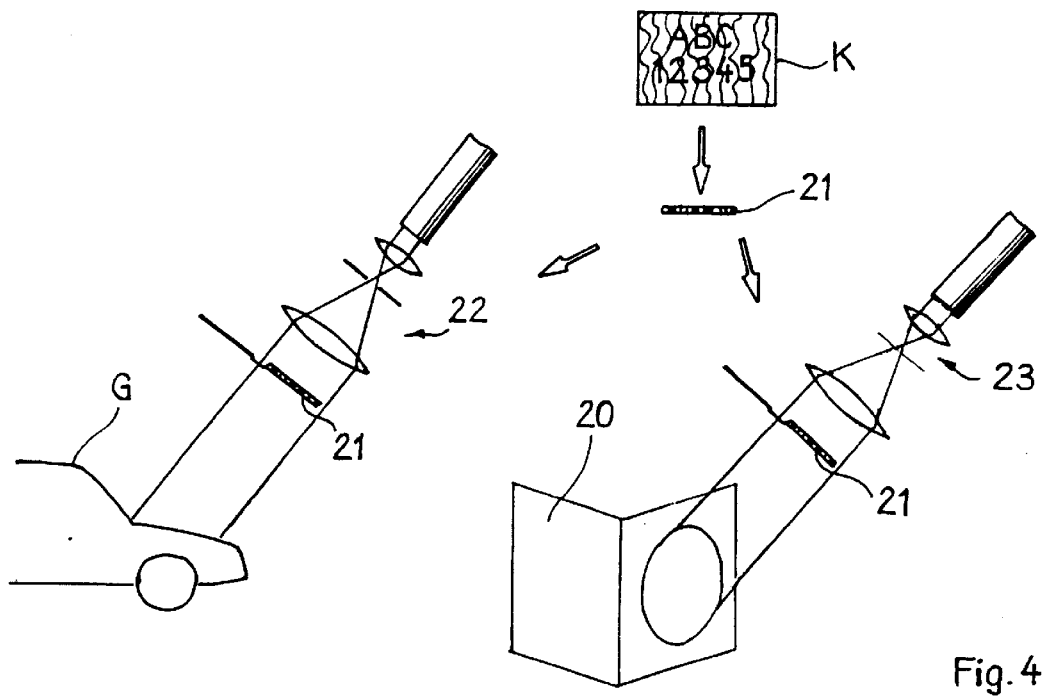
FIG. 4 is a principle representation of the device for inscribing an identification information to two different information carriers of a system of identification according to a second embodiment the invention.

In FIG. 4 a principle representation of a second embodiment of the invention is given referring to the identification objects of high value exposed to burglary or theft, for instance automobiles. The means for increasing the safety against counterfeiting by means to deflect the persons attention from the hidden means for checking the identity informations by other equivalent means for unconcealed identification in the case of securing objects refer to the person in charge of the object.

A mark of production K for a object G shall be imprinted both to the object (hence: an automobile) as well as to an accompanying document 20 (hence: a vehicle document) in a way safe to falsification or counterfeiting. From the identifier K firstly a transparent negatively 21 is produced.

This is put into the object beam of a UV-holographic device 22 on the one hand, directed to the mudguard of the automobiles G the working wavelength of which is adjusted to the preferred resonant frequency band of the lacquer. This is done in a way which has been described with respect to the first embodiment—in the lacquer of the of the mudguard UV-area hologram of the production identification is generated by the resonance absorption of the lacquer molecules without visible external damage.

On the other hand, the negative 21 is transported into the object beam of a second holographic apparatus 23, by means of which in the information carrier (paper) of the vehicle document by irradiation at the wavelength of the resonant frequency of the of the paper an area hologram of the product identification is generated too.

At a test of the identity of vehicle and vehicle document both items will be irradiate with coherent ultraviolet light of the respective wavelength, whereby the is hologram visualized again made and the conformity of the two identifications may be cross-checked.

Instead of the lacquer other non-metallic parts of a vehicle or other object may serve as information carrier i.e. provide the identification information.

The system is also useful in cases when—unlike the first example—the identification information is carried by an identity card the identification carriers or—like in the second example—accompanying document and object are to be marked but where only the object is to be marked, in case of a work of art or bank-note e.g.

While preferred embodiments have been shown and described, various modifications and substitutions may be made thereto without departing from the spirit and scope of the invention. Accordingly, it is to be understood that the present invention has been described by way of illustration and not limitation.

We claim:

1. A system for the identification of a person or an object with an information carrier having at least one means for identification not perceptible with a human sense organ, the identification means containing identification information characteristic of a certain person or object, the system comprising a device for inscripting the identification means on the information carrier and a device for reading and evaluating the identification means, the improvement comprising that the information carrier carries a recording containing the identification information, the recording being detectable only in ultraviolet light of a predetermined range of wavelengths, the identification information is contained in a restorable hologram produced by means of ultraviolet light, that the device for inscription includes means for generating the recording, and the device for reading and evaluating includes means for reading the recording by means of ultraviolet light and is concealed from the field of vision of the person to be identified or in charge of an object to be identified.

2. System for identification according to claim 1, wherein the device to read and evaluate comprises means for detecting identification information with respect to a distinguishing physical characteristic of a person or an object and comparator means for the comparison of the actual detected physical characteristic to the invisible inscripted identification.

3. System for identification according to claim 1 wherein the device to read and evaluate comprises means for the detection of a specimen of writing by the person to be identified.

4. System for identification according to claim 1, characterized in that that the identification information is contained in a restorable synthetic hologram generated with the aid of a computer.

5. System for identification according to claim 4, characterized in that the synthetic hologram is a restorable hologram generated by application of an integral transformation to the original identification information.

6. System for identification according to claim 1 wherein the identification is a figurative representation of the person or of the object.

7. System for identification according to claim 1 wherein the identification information includes a specimen of handwriting of the person.

8. System for identification according to claim 2 wherein the information carrier comprises several identification means, wherein during a process of identification, several identification means are read and evaluated and the comparator means compares several inscripted identifications with several actual physical characteristic features.

9. System for identification according to claim 2 wherein the device for detecting an actual physical characteristic of a person and the means for registration of the actual physical characteristic of the person are concealed from the person.

10. System for identification according to claim 1, further comprising a means for detecting an actual characteristic feature during an act of signing, said means for detecting comprising means to detect the form of the papillary line structure of a finger or thumb of the writing person.

11. System for identification according to claim 1, wherein the device for inscription includes means for generation of a latent picture on the information carrier by means of highly energized UV-laser-radiation without an externally noticeable alteration of the information carrier.

12. System for identification according to claim 1, wherein the information carrier includes identification information perceptible with the human sense organs at least partly covering another identification information not perceptible to human senses.

13. System for identification according to claim 1, further comprising means for generating a representation of the identification information not perceptible with the human sense organs, said generating means receiving a signal from said device for reading and evaluating, said generating means being concealed from the field of vision of the person to be identified or the person in charge of an object.

14. System for identification according to claim 1 wherein the device to read and evaluate comprises means for the detection of a signature of the person to be identified.

15. System for identification according to claim 1 wherein the identification is a figurative representation of a fingerprint of the person to be identified.

16. System for identification according to claim 1 wherein the identification is a figurative representation of a production mark of the object to be identified.

17. System for identification according to claim 1 wherein the identification information comprises a speech-frequency-diagram of the person to be identified.

* * * * *